United States Patent

[11] 3,587,881

| [72] | Inventor | Arthur E. Kurtz<br>New Providence, Pa. |
|---|---|---|
| [21] | Appl. No. | 770,988 |
| [22] | Filed | Oct. 28, 1968 |
| [45] | Patented | June 28, 1971 |
| [73] | Assignee | Armstrong Cork Company<br>Lancaster, Pa. |

[54] GLASS FURNACE CHARGER
1 Claim, 3 Drawing Figs.

[52] U.S. Cl..... 214/33,
65/335
[51] Int. Cl.................................................. B65g 25/10
[50] Field of Search.......................................... 65/335,
179; 214/18.2, 18.36, 28, 29, 30, 33

[56] References Cited
UNITED STATES PATENTS
| 2,804,981 | 9/1957 | La Plante et al............. | 65/335X |
| 3,193,119 | 7/1965 | Blaine ......................... | 65/335X |

*Primary Examiner*—S. Leon Bashore
*Assistant Examiner*—Saul R. Friedman
*Attorney*—Clifford B. Price

ABSTRACT: An apparatus for introducing batch materials across the surface of the molten glass in a glass tank furnace. A reciprocating arm is used to push the batch material from the area in which it is dropped in the furnace out across the surface of the molten glass. The reciprocating arm or pusher is pivotally mounted so that it may push the batch material in a plurality of directions. The pusher moves in a reciprocating manner backward and forward, and by changing the longitudinal axis of the pusher, it is possible to have the pusher reciprocate in a plurality of paths.

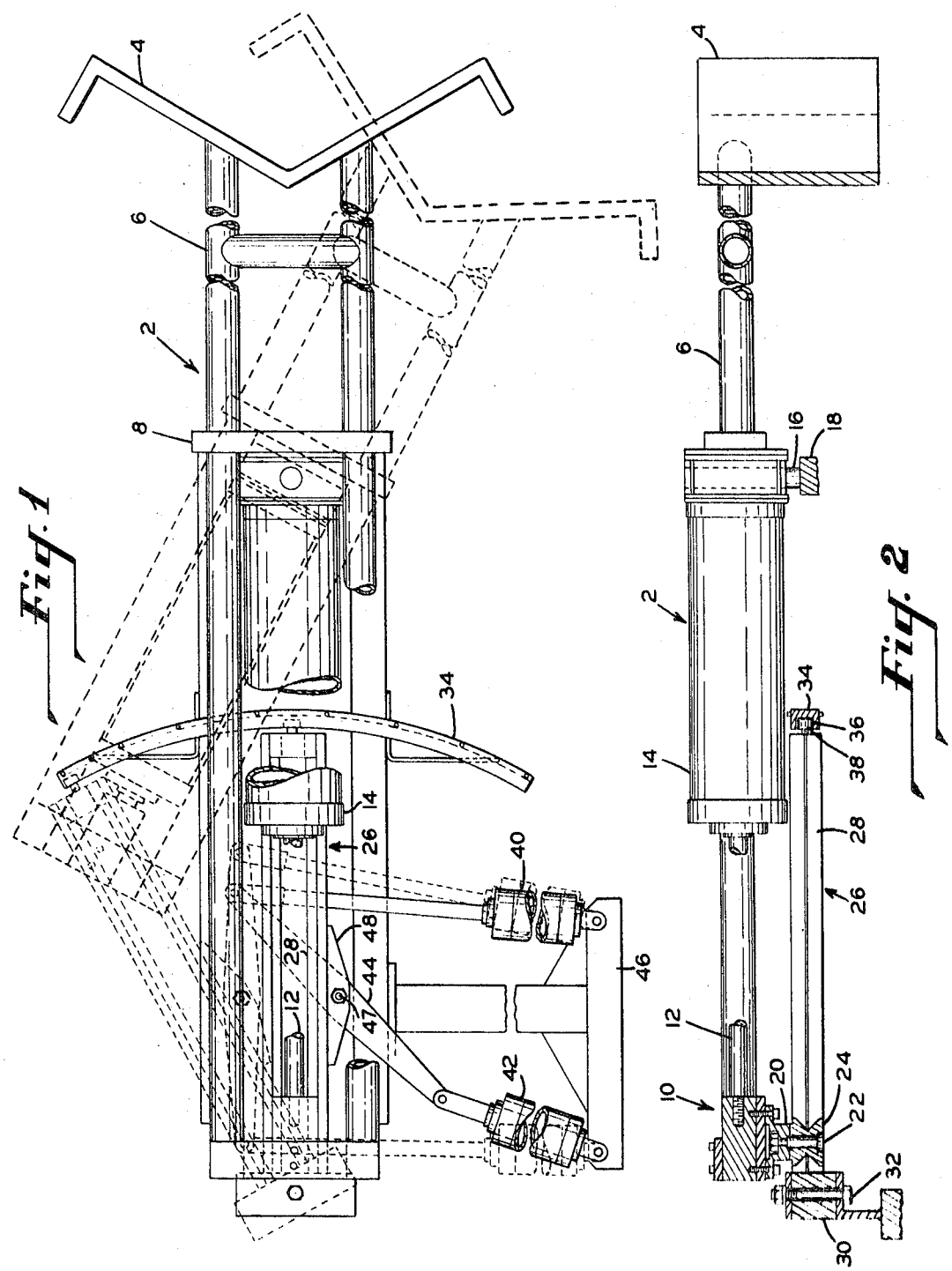

GLASS FURNACE CHARGER

BACKGROUND OF THE INVENTION

1. Field of the Invention

The present invention relates broadly to the supplying of batch materials to melting tanks. More particularly, it has to do with an improved apparatus for obtaining a more rapid uniform —and thorough melt of glass at a constant level by introducing the batch materials across the surface of the molten glass in the glass tank furnace into a plurality of separate locations across the surface of the molten glass.

2. Description of the Prior Art

The early forms of furnace charging devices merely used a reciprocating pusher structure which has the batch materials dropped in front of the pusher when it was in its retracted position. The pusher then moved forward into an extended position pushing the batch material out across the molten glass. The pusher, by reciprocating in only a single back-and-forth direction, merely pushes the batch material out to the center of the furnace.

Numerous structures were developed for the purpose of altering the pusher structure so that it would travel more than a single back-and-forth path. U.S. Pat. No. 923,410 discloses one of the early modifications of a furnace charger wherein the complete assembly is mounted on the plurality of arcuate rails and swings back and forth around a pivot point that permits the pusher to be moved in any number of separate back-and-forth paths.

U.S. Pat. No. 2,804,981 discloses another furnace charger structure wherein the pusher end is mounted so that it can move through any one of three separate reciprocating pathways by following any one of the legs of a substantially Y-shaped track. In this case, as in all other prior art structures, the pusher follows a general reciprocating pathway, and some type of mechanical structure may alter this pathway so that the plurality of separate reciprocating pathways can be utilized. In every case, a rather complicated structure is provided for the purpose of changing from one pathway to another.

It is the object of this invention to provide a rather simple structure for equipping the pusher with the capability of moving through a plurality of separate reciprocating pathways so that the batch material may be charged over a substantial portion of the surface area of the molten glass.

SUMMARY OF THE INVENTION

In the apparatus herein, a pusher is used to push the stock material into the melting area of the furnace. A plurality of fluid cylinders act upon a pivotally mounted slide to position the slide in any number of different positions within an arcuate segment. The pusher is operated by a fluid cylinder, and the end of the pusher arm has a pin which is mounted in the slideway of the above-mentioned slide. The pusher arm is pivotally mounted at a fixed point at about the midrange of its overall length. Consequently, movement to the right or left of the rear of the pusher arm will cause the front of the pusher to move either left or right due to the centrally located pivotal mounting of the pusher. The slide assembly which guides the pin on the end of the pusher arm is the structure that permits the movement of the rear of the pusher arm to the right or left. By positioning the slide, the amount of movement of the pusher arm to the right or left during its forward reciprocating movement will determine to what extent the pusher arm moves to the right or to the left as it moves forward to push the charge of material across the surface of the molten glass.

BRIEF DESCRIPTION OF THE DRAWINGS

FIG. 1 is a top view of the pusher assembly;
FIG. 2 is a side view of the pusher assembly of FIG. 1.

DESCRIPTION OF THE PREFERRED EMBODIMENT

Figure 3:
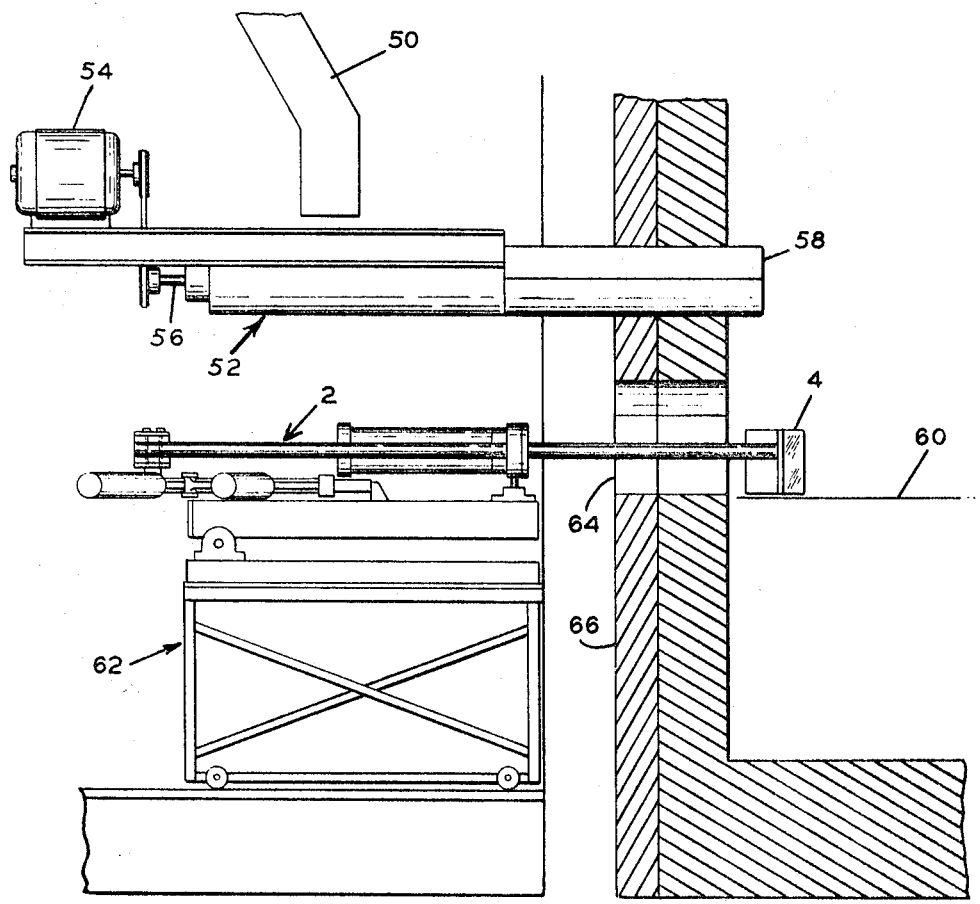
FIG. 3 is a side view of the furnace charger and furnace.

The pusher assembly 2 uses a rabble or blade 4 for pushing the batch materials out across the surface of the molten glass. The blade is attached to the end of a dual arm structure 6 which is in turn supported by a support block 8 in such a manner that the arm 6 may move in a reciprocating pathway. The ends of the arms opposite from the blade 4 are fastened to a block assembly 10. To the center of the block assembly 10 there is fastened the rod 12 of a fluid cylinder 14. The fluid cylinder 14 is a double-acting piston cylinder which causes the rod 12 to move backward and forward in reciprocating motion. This rod 12 in turn causes the block assembly 10 to move; and due to the fastening of the arm 6 to the assembly 10, the blade 4 is driven in a reciprocating fashion. The front end of the fluid cylinder 14 is pivotally mounted by pin 16 to a mounting assembly 18. This in turn means that the block 8 with the arms 6 carrying the blade 4 are mounted for rotation about the pivot 16 and are therefore capable of movement back and forth through an arcuate path in addition to their reciprocating motion which is provided by the fluid cylinder 14 and rod 12.

The block assembly 10 has fastened thereto on the underside thereof a small mounting block 20 which carries a pin 22. The pin 22 in turn passes through a slide follower 24 which is shaped to be constrained to the guideways of a slide structure.

A slide assembly 26 is mounted below the mounting block 10 and piston rod 12. The slide assembly has internally facing guideways 28 which engage the slide follower 24 and cause it to move in the pathway set by the guides 28. The slide assembly 26 has mounted on its one end a block 30 through which passes a pivot pin 32. This pivot pin 32 then functions as the pivot point for the slide assembly 26. The opposite end of the slide assembly 26 is freely mounted by means of an arcuate guide 34 which has a channel 36 for supporting roller 38 mounted on the end of the slide assembly 26. Consequently, the slide assembly 26 is capable of movement around pivot point 32 in an arcuate pathway.

Follower 24 moves down the slide assembly 26 and causes the end of the pusher arm 6 to follow whatever path is established by the slide assembly 26, since the pusher arms 6 are pivotally mounted due to the existence of the pivot pin 16, it will be seen through the dotted line showing of FIG. 1 that as the ends of the pusher arms move upward in the FIG. the pivot point will cause the blade 4 to move downward in the FIG. Referring to solid line showing of FIG. 1, it will be seen that the slide assembly 26 is mounted with its longitudinal axis parallel with the longitudinal axis of the pusher arms 6. Consequently, reciprocating motion of the pusher arms 6 will have the blade 4 moved merely back and forth in a reciprocating manner in a path parallel with the longitudinal axis of the slide assembly 26.

It can be seen that by merely shifting the position of the slide assembly 26, the direction of the reciprocating path of the pusher arms can be varied to any number of different pathways. It should be noted that only when the slide assembly 26 has its axis parallel with the axis of the pusher arms will the blade move in a straight-line reciprocating pathway. As the slide assembly axis swings away from the parallel relationship with the pusher arms, the pusher arms will still be guided in a reciprocating pathway; but the pathway will now be arcuate to a degree and either to the right or to the left of the above-mentioned straight reciprocating pathway.

The slide assembly 26 must be provided with some means for positioning it either to the right or left of its normal rest position which is parallel with the longitudinal axis of the pusher arms. The means providing the movement of the slide assembly 26 are two fluid cylinders 40 and 42 and a bellcrank structure 44. The fluid cylinders are fixedly mounted to a support 46 to one side of the slide assembly 26. The piston rods of the fluid cylinders are connected to the opposite ends of the bellcrank structure 44. The bellcrank structure 44 is in turn fastened by a pivot pin 47 to a small plate 48 which is fastened to the side of the slide assembly 26. The connection of the piston rods to the bellcrank, the bellcrank to the slide assembly and the fluid cylinders to the support 46 is such that these elements are capable of relative movement one to the other.

The solid line showing of FIG. 1 shows the relative positions of the fluid cylinders when the slide assembly 26 is in its normal rest position. The fluid cylinder 42 is in a generally retracted position while cylinder 40 is in a generally extended position. Referring to the dotted line showing of FIG. 1, it will be seen that fluid cylinder 42 has moved its piston rod to its generally fully extended position. This in turn, acting through bellcrank 44, causes the slide assembly to move to its extreme upper or left-hand position. It will be understood that retraction of the piston rod of fluid cylinder 40 to its fully retracted position while fluid cylinder 42 retains its solid line position will result in movement of the slide assembly to its lower or right-hand position.

From the above description, it will be seen that the rather simple movement of the slide assembly 26 will result in lateral movement of the pusher arms 6 as the arms move from their retracted position to their extended position. Lateral movement of the pusher arms 6 with their mounting about a pivot point 16 results in movement of the rabble 4 in a lateral pathway as it moves from its retracted to its extended position. Consequently, there is provided a furnace charger which is capable of movement through a plurality of different pathways so that batch material may be charged across a large portion of the surface of molten glass.

FIG. 3 is a showing of the furnace charger of this invention relative to a glass furnace. A chute 50 deposits batch material onto a conveyor assembly 52. This assembly 52 has some type of drive means 54 moving a feed means 56 so that the batch material will be transported to the end 58 of the conveyor means 52. The batch material falls from the end 58 of the conveyor means in front of the rabble or blade 4. The rabble or blade 4 is mounted above the surface 60 of the molten glass. The batch material will tend to stack up in front of the blade 4 on the surface of the molten glass. The blade 4 is used to push this batch material out across the surface of the glass. The pusher assembly 2 is mounted on a support structure 62 which in turn is mounted on rollers so that it may be withdrawn from position by the furnace. The small entrance port 64 is provided in the wall 66 of the furnace so that the pusher blade 4 may extend into the furnace to distribute the batch material.

I claim:

1. In a batch-pushing apparatus for supplying batch material to the melting areas of a glass tank furnace comprising a blade for pushing the batch material across the surface of molten glass therein, a reciprocating pusher arm structure having one end fastened to the blade, means for mounting the arm structure for pivotal movement at a point about midrange of the overall length thereof, a slide assembly mounted adjacent the end of the arm structure opposite the end carrying the blade, slide follower means pivotally fastened to the arm assembly to guide said arm assembly along the slide assembly and, means for moving the pusher arms, the improvement comprising slide pivot means mounted adjacent said pusher arm pivotal fastening means, means mounted adjacent the slide assembly to pivot said slide assembly on said slide pivot means to variable positions to provide plural slide pathways to the right or left of the longitudinal axis of the pusher arms, arcuate guide means mounted adjacent the end of said slide means opposite the pivoted end thereof and means mounted on the end of said slide means in cooperating relationship with said arcuate guide means to support said slide means as it is moved along said arcuate guide means whereby variable pivotal movement of the slide within an arcuate segment provides different slide pathways and enables the pusher blade to be moved through a plurality of separate reciprocating pathways so that batch material may be charged over varied areas of the surface of the molten glass.